Patented Jan. 28, 1930

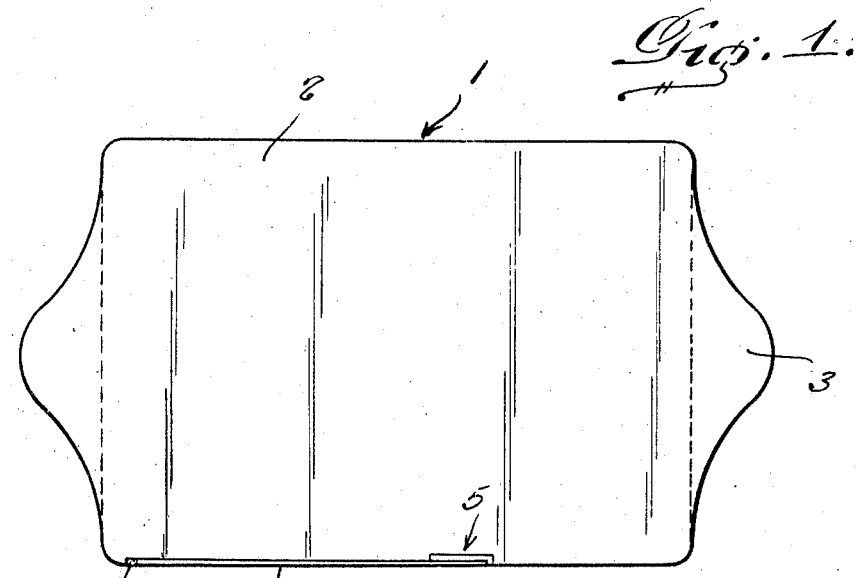
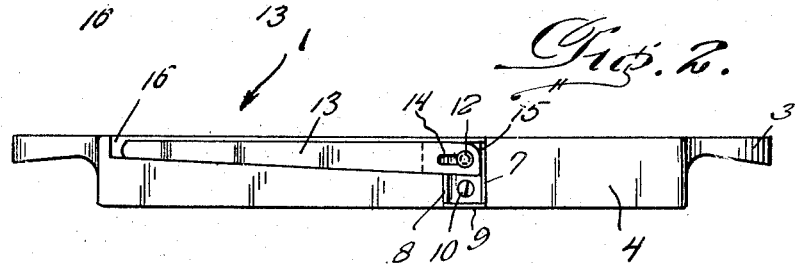
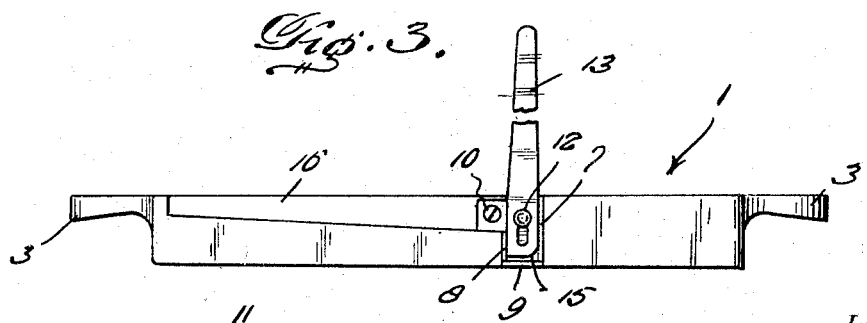
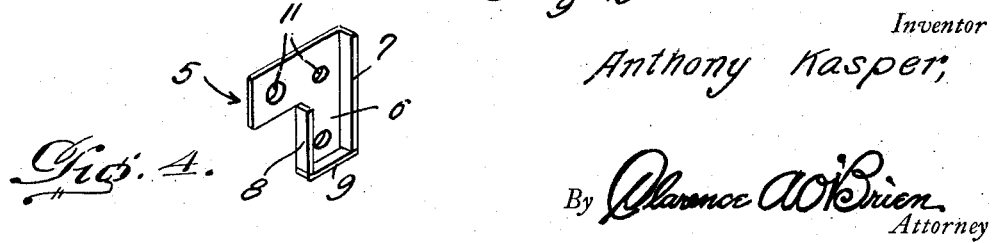
Inventor
Anthony Kasper;

1,745,099

UNITED STATES PATENT OFFICE

ANTHONY KASPER, OF SCOTIA, NEW YORK

CUTTING BOARD

Application filed September 29, 1927. Serial No. 222,830.

The present invention relates to cutting boards for use in slicing bread, vegetables, meat and the like, and has for its principal object to provide a guide for the knife used in the cutting operation, whereby the person using the device will not be apt to cut his fingers such as frequently results when slicing any article on an ordinary board.

One of the important objects of the present invention is to provide a cutting board having a knife guide or gage associated with one longitudinal edge thereof in such a manner as to permit said guide to be readily moved to an operative or inoperative position.

A still further object of the invention is to provide a cutting board of the above mentioned character which is simple in construction, inexpensive, strong and durable and further well adapted to the purposes for which it is designed.

Other objects and advantages will become apparent during the course of the following description.

In the accompanying drawing forming a part of this application, and in which like numerals indicate like parts throughout the same:

Figure 1 is a top plan view of the cutting board embodying my invention showing the knife guide in a lowered inoperative position.

Figure 2 is a front end edge elevation thereof.

Figure 3 is a similar view showing the knife guide in a raised operative position, and Figure 4 is a detail perspective view of the bracket forming a part of the present invention.

In the drawing wherein for the purpose of illustration is shown the preferred embodiment of my invention, the numeral 1 designates generally my improved cutting board, the same comprising a substantially rectangular shaped base 2, having suitable handles 3 formed at its respective ends. This base may be formed of any suitable wood and secured in a suitable cut out portion provided therefor in the forward longitudinal edge 4 at the intermediate portion thereof is the bracket designated generally at 5. This bracket comprises a substantially inverted L-shaped member formed of any suitable metal, the vertically disposed arm 6 of this bracket being formed with the forwardly extending flanges 7 and 8 at its sides and with a similar flange 9 at its lower edge as clearly disclosed in Figure 4 and the purpose of these flanges will be hereinafter more fully described.

This bracket is secured to the forward longitudinal edge of the base by any approriate securing means such as is shown at 10 and extending through the opening 11 formed in the upper end portion of the vertical arm of the inverted L-shaped bracket is a headed pin 12, the inner end being secured in the edge portion of the base in any appropriate manner. As clearly disclosed in the drawing, this pin is located above the upper edge of the side flange 8, and the purpose of this construction or arrangement will be presently apparent.

Forming a salient part of the present invention is the elongated tapered thin guide strip 13, the same being formed with a longitudinal slot 14 in the larger end thereof, the headed pin 12 extending through this slot whereby to provide a pivotal connection for the guide strip.

The larger end of this strip is adapted for vertical slidable movement within the bracket 5 between the side flanges 7 and 8, and as is clearly disclosed in Figures 2 and 3, one corner of the larger end of this guide strip is rounded as indicated at 15 to facilitate the pivotal movement of the strip when the strip has been moved vertically in the bracket so that the lower end of the slot 14 is in engagement with the pin 12 and by swinging the strip laterally, the strip may be moved to an inoperative position against the forward longitudinal edge of the base and to accommodate this strip. The upper portion of the forward edge of the base is cut out as indicated at 16. When said strip is disposed in horizontal inoperative position, one edge portion of the strip will abut the upper edge of the shorter side flange 8, as clearly disclosed in Figure 2.

When the strip is disposed in a vertical position in the manner as shown in Figure 3, the flanges 7 and 8 will cooperate with the side edges of the strip to maintain the same in a vertical position against lateral swinging movement, and when the bread, meat, vegetable or other article is placed on the board to be cut, the article will be placed against one edge of the guide strip with a portion of the article projecting beyond the forward edge of the base and then by moving the knife across the front face of the strip in a vertical direction, the article can be sliced in an easy and efficient manner.

The provision of the guide strip for the knife used in cutting or slicing any article placed on the base, will enable a person to properly perform the slicing operation without any danger of bringing his fingers in the path of movement of the knife.

The simplicity of my improved cutting board and guide strip associated therewith enables the same to be manufactured at a very low cost and furthermore the guide strip may be readily and easily moved to an operative or inoperative position.

While I have shown the preferred embodiment of my invention, it is to be understood that various changes in the size, shape and arrangement of parts may be resorted to without departing from the spirit of the invention and the scope of the appended claim.

Having thus described the invention, what I claim as new and desire to secure by Letters Patent is:—

In a cutting board of the class described, a substantially rectangular shaped base, a bracket secured on the forward longitudinal edge of the base, said forward longitudinal edge being formed with a cut out portion that extends longitudinally along the upper edge portion, forwardly extending flanges formed on the sides of the bracket, one flange being of a greater height than the other, the shorter flange having its upper edge terminating at the lower edge of one end portion of the cut out portion of the forward edge of the base, a guide strip, a pin and slot connection between the guide strip and said bracket whereby the strip is pivotally and slidably associated with the bracket, said strip being disposed vertically between the flanges when in an operative position, and horizontally for disposition within the cut out portion of the forward longitudinal edge of the base when in an inoperative position, one edge of the strip engaging the upper edge of the shorter flange when in said last mentioned position.

In testimony whereof I affix my signature.

ANTHONY KASPER.